(12) United States Patent
Biazetti et al.

(10) Patent No.: US 8,892,703 B2
(45) Date of Patent: Nov. 18, 2014

(54) CROSS-CUTTING EVENT CORRELATION

(75) Inventors: Ana C. Biazetti, Cary, NC (US); Fonda J. Daniels, Cary, NC (US); Kent F. Hayes, Jr., Chapel Hill, NC (US); Paul F. McMahan, Apex, NC (US); Denilson Nastacio, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 2699 days.

(21) Appl. No.: 11/395,736

(22) Filed: Mar. 31, 2006

(65) Prior Publication Data

US 2007/0233836 A1 Oct. 4, 2007

(51) Int. Cl.
*G06F 15/173* (2006.01)
*H04L 29/08* (2006.01)
*H04L 12/24* (2006.01)
*G06F 11/34* (2006.01)

(52) U.S. Cl.
CPC .......... *H04L 41/065* (2013.01); *G06F 11/3452* (2013.01); *G06F 2201/86* (2013.01); *H04L 67/125* (2013.01); *G06F 2201/865* (2013.01); *G06F 11/3495* (2013.01)
USPC .......................................... 709/223; 709/224

(58) Field of Classification Search
USPC ............................ 709/220, 223, 224; 370/256
See application file for complete search history.

(56) References Cited

U.S. PATENT DOCUMENTS

| | | | | |
|---|---|---|---|---|
| 6,460,070 | B1 * | 10/2002 | Turek et al. | 709/202 |
| 6,553,403 | B1 | 4/2003 | Jarriel et al. | |
| 2003/0236689 | A1 | 12/2003 | Casati et al. | |
| 2006/0015603 | A1 * | 1/2006 | Jakobson et al. | 709/223 |

FOREIGN PATENT DOCUMENTS

WO WO 01/99321 A1 12/2001

* cited by examiner

*Primary Examiner* — Brian P Whipple
(74) *Attorney, Agent, or Firm* — Steven Greenberg, Esq.; CRGO Law

(57) ABSTRACT

Embodiments of the present invention provide a method, system and computer program product for cross-cutting event correlation in an enterprise computing monitoring and management system. An enterprise computing monitoring and management system can include a hierarchy of nodes, where several of the nodes are each coupled to a corresponding embedded correlation engine and an event bus. The system further can include a root node among the nodes. The root node can be coupled to the event bus and to centralized correlation logic programmed to identify a high correspondence between events from a particular event source among the nodes and a particular set of correlation rules in that correlation engine. The identification of such correspondence can be used to move to the set of correlation rules to an embedded correlation engine closer to the particular event source.

5 Claims, 2 Drawing Sheets

CROSS-CUTTING EVENT CORRELATION

BACKGROUND OF THE INVENTION

1. Field of the Invention

The present invention relates to enterprise computing monitoring and management, and more particularly to event processing in an enterprise computing monitoring and management system.

2. Description of the Related Art

Enterprise computing monitoring relates to the monitoring of the state of the different, granular components of an enterprise computing environment, as well as the state of the enterprise computing environment in the aggregate. Generally intended for use by network and application administrators, enterprise computing monitoring systems monitor selected elements in the network of components forming the enterprise computing environment. Enterprise computing monitoring systems are traditionally organized in a hierarchical fashion, with sensors distributed throughout the network of components forming the enterprise computing environment. These sensors relay monitored events to aggregation nodes, which in turn can relay the monitored events to a smaller set of aggregation nodes. Monitored events can be interpreted, translated and provided to interacting administrators in order to facilitate the management of the enterprise computing environment.

A skeletal enterprise monitoring system can collect events propagated from different levels of the hierarchy of nodes defining the enterprise computing monitoring system. The collected events, in turn, can be reported plainly through a user interface in a monitoring application and it remains incumbent upon the user to interpret and act upon the reported events. Given the complexity of the modern enterprise computing environment, however, commercially viable enterprise monitoring systems provide an enhanced degree of event interpretation and remedial, automated action taking.

Clearly, nodes in the hierarchy of an enterprise monitoring system can be interrelated such that events occurring in a child node of the hierarchy can form the root cause of other events originating at higher levels of the hierarchy in parent nodes. Consequently, plainly reporting every event arising in the hierarchy can result in an event flood and can quickly overwhelm the enterprise computing monitoring system. Of course, capturing every event stemming from a root cause event is not as helpful as correcting the root cause event. In particular, resolving the cause of root cause event in the event source invariably leads to the resolving of all other resulting events.

To achieve efficiencies in monitoring, event correlation engines can be embedded within nodes in the network of elements of the enterprise computing environment. Consequently, the event correlation engines can most quickly identify and handle events arising from within the node without depending upon event correlation engines higher in the in hierarchy of enterprise computing monitoring systems to process these events. In this regard, correlation rules applied by event correlation engines generally trigger responsive events for detected events. Yet, in many cases, important event patterns can be detected only at a higher level in the hierarchy. In the latter circumstance, it is desirable to place an event correlation engine at a higher level in the hierarchy so as to capture and process events stemming from many different nodes below.

Correlation rules often are composed by domain experts and processed by a correlation engine at a selected level in the hierarchy of the enterprise computing monitoring system so as to achieve optimal efficiency in processing events below. Coordinating the deployment of correlation rules can be challenging in an expansive enterprise computing environment. Consequently, in many enterprise systems, the correlation engine is centralized at a highest level in the hierarchy such that all events generated in environment can be captured and processed in the correlation engine. Notwithstanding, scalability will be sacrificed in this circumstance.

BRIEF SUMMARY OF THE INVENTION

Embodiments of the present invention address deficiencies of the art in respect to event correlation management and provide a novel and non-obvious method, system and computer program product for cross-cutting event correlation in an enterprise computing monitoring and management system. By cross-cutting event correlation, it is meant that all events processed by a correlation engine are also processed by a correlation rule that attempts to identify events from a particular event source that correlate with a high degree of frequency to a particular set of disparate correlation rules processing the events. In this way, greater efficiencies can be obtained by moving a suitable set of correlation rules for processing in an embedded correlation engine closer to the particular event source. The notion of proximity between the correlation engine and the particular event source can be defined in terms of the communication latency between the two nodes or number of network links separating the two nodes. The choice of a proximity criterion is not central to this invention.

In one embodiment, an enterprise computing monitoring and management data processing system can include a hierarchy of nodes, where several of the nodes are each coupled to a corresponding embedded correlation engine and an event bus. The system further can include a root node among the nodes. The root node can be coupled to the event bus and to centralized correlation logic. Each correlation node in turn can be programmed with the cross-cutting correlation rule to identify a high correspondence between events from a particular event source among the nodes and a set of correlation rules and to move the corresponding correlation rules to an embedded correlation engine closer to the particular event source.

Optionally, the program code of the cross-cutting correlation rule further can be enabled to monitor a set of attributes for each of the events handled in different embedded correlation engines in the hierarchy, to identify patterns among the events, and to trigger actions upon identifying the patterns. For instance, the attributes can include severity, source and situation category. In this regard, at least one of the patterns can match events demonstrating a particular degree of severity and situation category and arising from a particular event source with a particular frequency. As another option, the cross-cutting correlation rule can yet further be enabled to query a database of correlation rules using one or more of the identified patterns to locate a correlation rule enabled to match the attributes of the identified patterns, and to copy the located correlation rule to a correlation engine for an event source for the identified patterns.

In another embodiment of the invention, a cross-cutting event correlation method can include receiving events originating from different event sources, detecting a high correspondence between events received from a particular event source and a set of correlation rules, and moving the corresponding correlation rules closer to the particular event source.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for cross-cutting event correlation for events processed in the nodal hierarchy of an enterprise computing monitoring and management data processing system. In accordance with an embodiment of the present invention, events can be managed within different nodes of the nodal hierarchy according to correlation rules for the different levels. Additionally, the events of the data processing system can be analyzed by cross-cutting correlation rules to identify high-frequency patterns across the events from an event source. Responsive to identifying events having a strong affinity to a particular node of the hierarchy, a corresponding correlation rule can be placed into the particular node of the hierarchy in order to provide for event processing closer to a source of the cross-cutting events.

Figure 1:
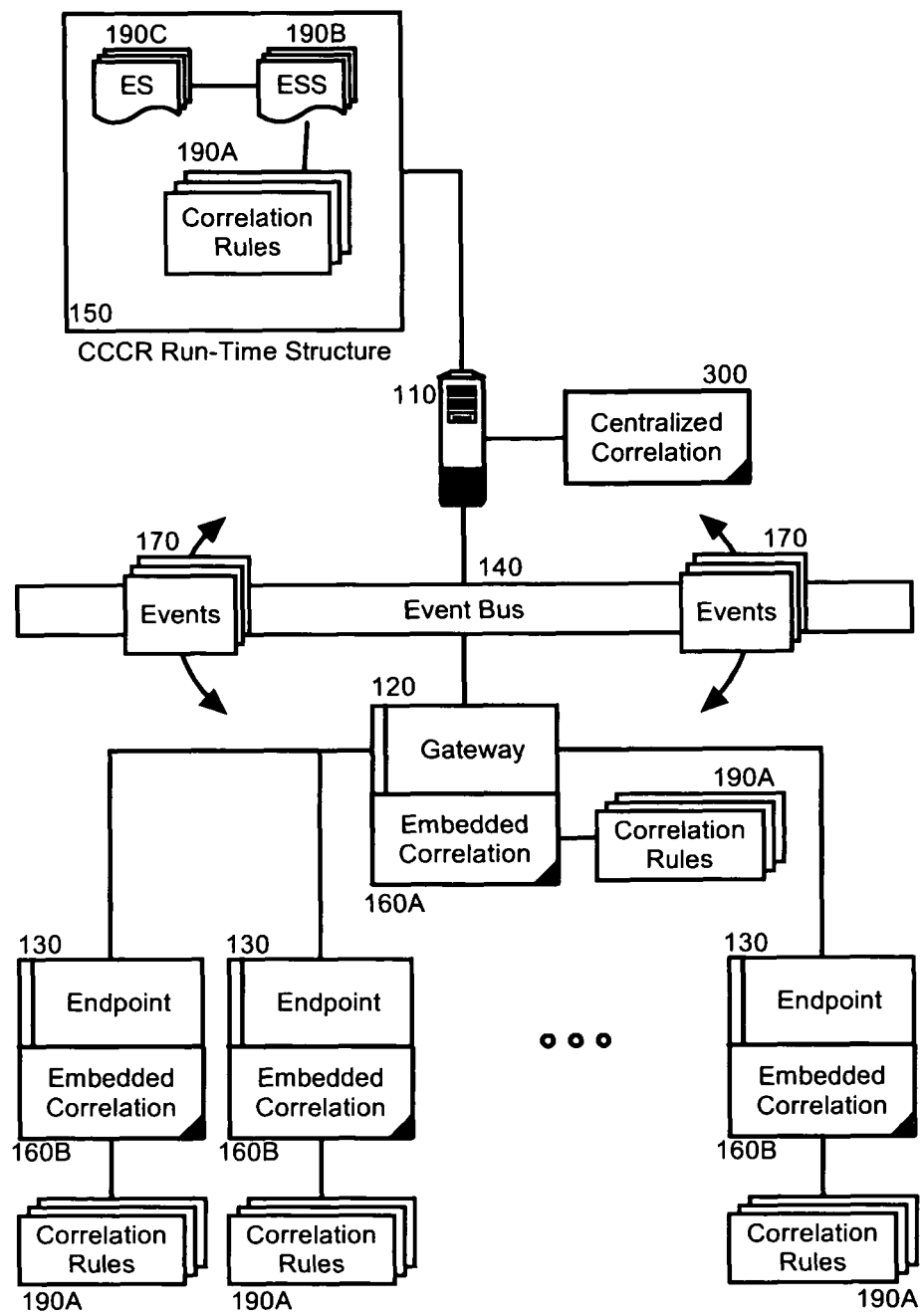
FIG. 1 is a schematic illustration of an enterprise computing monitoring and management data processing system configured for cross-cutting event correlation.

In illustration, FIG. 1 is a schematic illustration of an enterprise computing monitoring and management data processing system configured for cross-cutting event correlation. The data processing system can include a root processing node 110 coupled to at least one gateway node 120 coupled to one or more endpoint nodes 130. The gateway node 120 can include embedded correlation logic 160A as well the endpoint nodes 130 can include embedded correlation logic 160B. The embedded correlation logic 160A, 160B can include program code enabled to process correlation rules 190A responsive to the receipt of different events originating from a coupled gateway node 120 or endpoint node 130 as the case may be.

In this regard, a detected event contains information about a condition within a resource of the data processing system. Correlation rules can provide for a particular response to detecting an event that can include merely notifying an administrator of the occurrence of the event, or a remedial action to be performed in response to the event. Correlation rules also can provide for a response to the detection of a pattern of many events, whereas the occurrence of a single event may not elicit a response. Examples include a threshold number of times an event occurs within a certain time frame, or a threshold number of different types of events received for a particular resource.

Notably, whereas events received in the gateway 120 and endpoints 130 can be processed locally by embedded correlation logic 160A, 160B, centralized correlation logic 300 can be coupled to the root computing node 110. The centralized correlation logic 300 can include program code enabled to process events 170 received on the event bus 140 originating from multiple different event sources, including the gateway 120 and the endpoints 130. Importantly, the program code centralized correlation logic 300 can process the events 170 on the event bus 140 even though those events 170 will have been processed potentially in the embedded correlation logic 190A.

Figure 2:
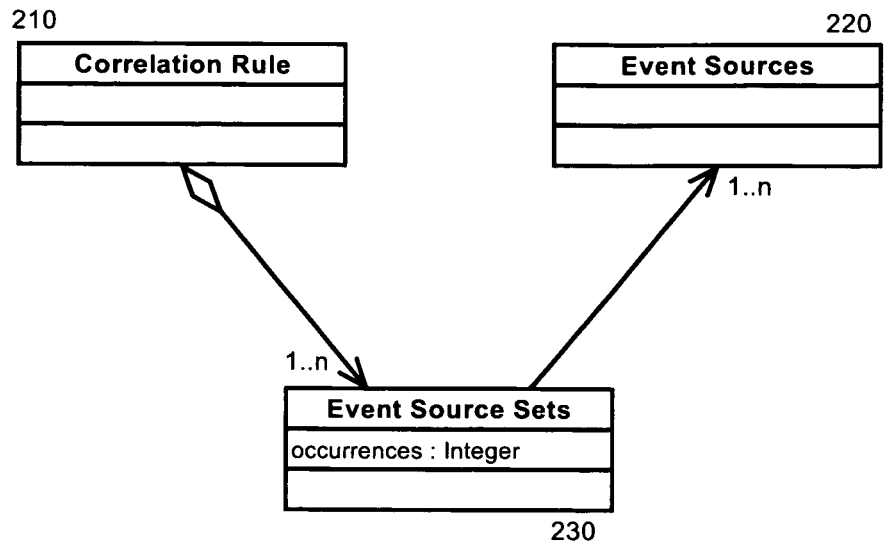
FIG. 2 is a class diagram of the cross-cutting correlation run-time representation structure of the data processing system of FIG. 1; and, FIG. 3 is a flow chart illustrating a process for cross-cutting event correlation in the data processing system of FIG. 1.

In processing the events 170 on the event bus 140, the centralized correlation logic 300 can manipulate a cross-cutting correlation run-time representation structure 150 in order to identify a source of the events 170. The cross-cutting correlation run-time representation structure 150 can include multiple different correlation rules 190A referencing one or more event source sets 190B. Each of the event source sets 190B can reference one or more event sources 190C and can track the frequency of occurrence for the events 170 across the different event sources 190C. By identifying the frequency of occurrence for the events 170, the program code of the centralized correlation logic 300 can determine whether the correlation rule 190A for a particular set of events 170 for an event source set 190B should be processed at the source node associated with the events 170. In this regard, higher frequency values tend to indicate the necessity for the correlation rule 190A to be processed closer to an associated event source 190C. The foregoing process also can be performed on embedded correlations 160A to determine whether a subset of correlation rules 190A with high correspondence to event sources 130 should be moved to embedded correlations 160B In more particular illustration, FIG. 2 is a class diagram of the cross-cutting correlation rule run-time representation structure of the data processing system of FIG. 1. As shown in FIG. 2 each correlation rule 210 can reference one or more event source sets 230. Each of the event source sets 230, in turn, can reference one or more associated event sources 220, where it keeps the frequency count of events received for each event sources. Moreover, each of the event source sets 230 can track and store the frequency of occurrence for an event processed by the correlation rule 210 according to its event source. In this way, the run-time representation structure can be processed to indicate when a correlation rule 210 is to be moved closer to an event source 220 based a high frequency of occurrence of events associated with the event source 220.

Optionally, utilizing the correlation rule run-time structure, inconspicuous patterns can be identified among events on each correlation engine. Specifically, the program code of the cross-cutting correlation logic on each correlation engine can be enabled to monitor a set of attributes for each event such as severity, source and situation. Consequently, patterns can be identified such as identifying events demonstrating a particular degree of severity and arising from a particular event source with a particular frequency. When patterns are detected repeatedly and reach a specified threshold value, it will be concluded that the rules should be deployed to handle the patterns. Additionally, the identified patterns can be used to query a database of correlation rules to locate a correlation rule enabled to match the attributes of the identified pattern.

The located correlation rule in turn can be copied to a correlation engine closer to the event source(s) in the identified pattern.

Figure 3:
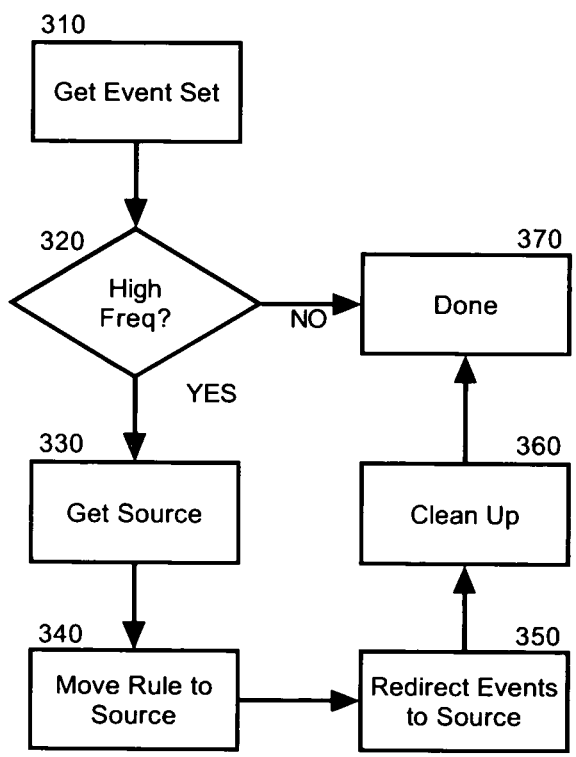

In further illustration of the operation of the centralized controller, FIG. 3 is a flow chart illustrating a process for cross-cutting event correlation in the data processing system of FIG. 1. Beginning in block 310, an event set can be retrieved from among a set of event sets for consideration. In decision block 320, it can be determined whether an event associated with the event set has been processed by a corresponding correlation rule with a high degree of frequency for a particular event source. If so, in block 330, the event source can be identified and in block 340, the correlation rule can be moved or copied towards the event source in a corresponding correlation engine in order to assure processing of the correlation rule closer to the event source. Thereafter, in block 350 the event sources are configure to also send events to the correlation engine for the event source for processing and in block 360 those event sets that are not frequently accessed can be removed from further consideration. Finally, in block 370 the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A cross-cutting event correlation method comprising:
   receiving in centralized correlation logic executing in memory by a processor of a computer, events originating from a plurality of different event sources;
   detecting a high frequency of occurrence of a received event in a particular event source; and,
   in response to detecting the high frequency of occurrence of the received event in the particular event source, moving a corresponding correlation rule closer to the particular event source.

2. The method of claim 1, further comprising:
   monitoring a set of attributes for each of the events handled in different embedded correlation engines for the different event sources;
   identifying patterns for the set of attributes among the events; and,
   triggering actions upon identifying the patterns.

3. The method of claim 2, wherein monitoring a set of attributes for each of the events handled in different embedded correlation engines for the different event sources, comprises monitoring a severity and situation category for each of the events handled in different embedded correlation engines for the different event sources.

4. The method of claim 3, wherein identifying patterns for the set of attributes among the events, comprises identifying patterns of events demonstrating a particular degree of severity arising from a particular event source with a particular frequency.

5. The method of claim 2, further comprising:
   querying a database of correlation rules using an identified one of the patterns to locate a correlation rule enabled to match the attributes of the identified one of the patterns; and,
   copying the located correlation rule to a correlation engine for an event source for the identified one of the patterns.

* * * * *